US012205409B2

(12) United States Patent
Sano et al.

(10) Patent No.: US 12,205,409 B2
(45) Date of Patent: Jan. 21, 2025

(54) METHOD FOR GENERATING LEARNED MODEL, SYSTEM FOR GENERATING LEARNED MODEL, PREDICTION DEVICE, AND PREDICTION SYSTEM

(71) Applicant: NIHON KOHDEN CORPORATION, Tokyo (JP)

(72) Inventors: Hiroto Sano, Tokorozawa (JP); Wataru Matsuzawa, Tokorozawa (JP); Takuya Kawashima, Tokorozawa (JP)

(73) Assignee: NIHON KOHDEN CORPORATION, Tokyo (JP)

( * ) Notice: Subject to any disclaimer, the term of this patent is extended or adjusted under 35 U.S.C. 154(b) by 288 days.

(21) Appl. No.: 17/677,154

(22) Filed: Feb. 22, 2022

(65) Prior Publication Data

US 2022/0284739 A1 Sep. 8, 2022

(30) Foreign Application Priority Data

Mar. 3, 2021 (JP) .................................. 2021-033548

(51) Int. Cl.
*G06V 40/20* (2022.01)
*G06V 10/82* (2022.01)
*G06V 40/16* (2022.01)

(52) U.S. Cl.
CPC .............. *G06V 40/28* (2022.01); *G06V 10/82* (2022.01); *G06V 40/174* (2022.01); *G06V 2201/033* (2022.01)

(58) Field of Classification Search
CPC ...... G06V 40/28; G06V 40/174; G06V 10/82; G06V 2201/033

(Continued)

(56) References Cited

U.S. PATENT DOCUMENTS 11,216,704 B2 * 1/2022 Couse ..................... G06V 40/23
2009/0287070 A1 * 11/2009 Baker, Jr. ................ G16Z 99/00
600/324

(Continued)

FOREIGN PATENT DOCUMENTS

JP 2014-528314 A 10/2014
JP 2016-99982 A 5/2016

(Continued)

OTHER PUBLICATIONS

Communication issued on Oct. 1, 2024 by the Japan Patent Office for Japanese Patent Application No. 2021-033548.

(Continued)

*Primary Examiner* — William D Titcomb
(74) *Attorney, Agent, or Firm* — Sughrue Mion, PLLC

(57) ABSTRACT

A method for generating a learned model applied to a prediction device that predicts a probability that a subject develops delirium based on a moving image in which the subject appears is provided. The method includes: acquiring first data corresponding to the moving image in which the subject appears; generating, based on the first data, second data corresponding to changes over time in relative positions of a plurality of feature points in a body of the subject in the moving image; generating third data indicating a determination result as to whether the subject develops delirium based on the moving image; and generating the learned model by causing a neural network to learn using the second data and the third data.

13 Claims, 5 Drawing Sheets

(58) Field of Classification Search
USPC .......................................................... 382/128
See application file for complete search history.

(56) References Cited

U.S. PATENT DOCUMENTS

| | | | |
|---|---|---|---|
| 2014/0235969 | A1 | 8/2014 | Van Der Heide et al. |
| 2018/0033276 | A1 | 2/2018 | Whelan et al. |
| 2018/0330152 | A1* | 11/2018 | Mittelstaedt ......... G06V 40/167 |
| 2019/0294868 | A1 | 9/2019 | Martinez |
| 2019/0326013 | A1* | 10/2019 | Rashidi .................. G16H 40/63 |
| 2020/0125902 | A1* | 4/2020 | Couse ...................... G06N 3/04 |
| 2020/0265950 | A1 | 8/2020 | Hosoi et al. |
| 2020/0342608 | A1 | 10/2020 | Lamichhane et al. |
| 2021/0150344 | A1* | 5/2021 | Kawashima ......... A61B 5/0245 |
| 2021/0287785 | A1* | 9/2021 | Fabbri ................. G06V 40/107 |
| 2022/0044821 | A1* | 2/2022 | Eichler ................. G16H 50/20 |
| 2022/0125338 | A1 | 4/2022 | Ohno et al. |
| 2022/0139092 | A1* | 5/2022 | Hashimoto .......... G06V 10/774 |
| | | | 382/156 |
| 2022/0254191 | A1 | 8/2022 | Martinez |
| 2022/0284739 | A1* | 9/2022 | Sano ...................... G06V 40/20 |

FOREIGN PATENT DOCUMENTS

| | | |
|---|---|---|
| JP | 2018-49592 A | 3/2018 |
| JP | 2019-517693 A | 6/2019 |
| JP | 2021-505264 A | 2/2021 |
| WO | 2019/044619 A1 | 3/2019 |
| WO | 2020/170290 A1 | 8/2020 |

OTHER PUBLICATIONS

Madoka Inoue et al., "Bed-Exit Prediction Applying Neural Network Combining Bed Position Detection and Patient Posture Estimation", 2019 41st Annual International Conference of the IEEE Engineering in Medicine and Biology Society (EMBC), pp. 3208-3211, doi: 10.1109/EMBC.2019.8857233.

Madoka Inoue et al., "Detection of Bed Position for Automation of Patient Monitoring Function", IEEJ Transactions on Electronics, Information and Systems, 2018, vol. 138, No. 6, pp. 670-677, doi: 10.1541/ieejeiss.138.670.

Communication dated Dec. 10, 2024, issued by the Japanese Patent Office in Japanese Application No. 2021-033548.

* cited by examiner

METHOD FOR GENERATING LEARNED MODEL, SYSTEM FOR GENERATING LEARNED MODEL, PREDICTION DEVICE, AND PREDICTION SYSTEM

CROSS-REFERENCE TO RELATED APPLICATIONS

This application is based on and claims priority under 35 USC 119 from Japanese Patent Application No. 2021-033548 filed on Mar. 3, 2021, the contents of which are incorporated herein by reference.

TECHNICAL FIELD

The presently disclosed subject matter relates to a method for generating a learned model applied to a prediction device that predicts a probability that a subject develops delirium based on a moving image in which the subject appears, and a system for generating the learned model. The presently disclosed subject matter also relates to a computer program executable in the system. The presently disclosed subject matter also relates to the prediction device and a computer program executable by a processor of the prediction device. The presently disclosed subject matter also relates to a prediction system including an image processing device that processes the moving image and the prediction device.

BACKGROUND

JP-T-2014-528314 discloses a technique for detecting whether a subject develops delirium based on an image in which the subject appears.

An object of the presently disclosed subject matter is to automate an evaluation as to whether a subject develops delirium while reducing degree of subjective contribution of an individual.

SUMMARY

A first aspect for achieving the above object is a method for generating a learned model applied to a prediction device that predicts a probability that a subject develops delirium based on a moving image in which the subject appears, the method including:

acquiring first data corresponding to the moving image in which the subject appears;

generating, based on the first data, second data corresponding to changes over time in relative positions of a plurality of feature points in a body of the subject in the moving image;

generating third data indicating a determination result as to whether the subject develops delirium based on the moving image; and generating the learned model by causing a neural network to learn using the second data and the third data.

BRIEF DESCRIPTION OF DRAWINGS

Exemplary embodiments of the present invention will be described in detail based on the following figures, wherein.

DESCRIPTION OF EMBODIMENTS

An exemplary embodiment will be described in detail below with reference to the accompanying drawings.

Figure 1:
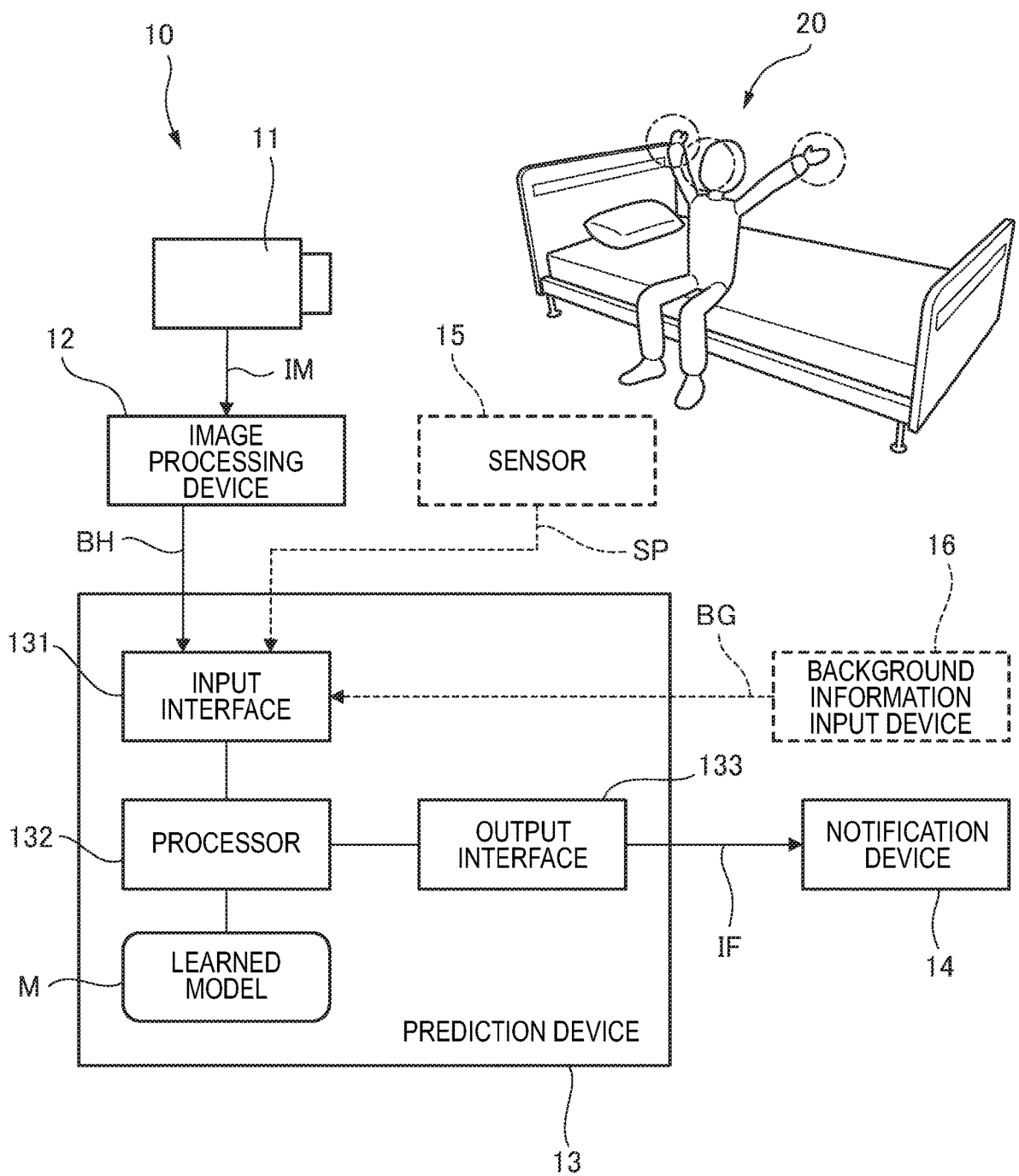
FIG. 1 illustrates a configuration of a prediction system according to an embodiment.

FIG. 1 illustrates a configuration of a prediction system 10 according to an embodiment. The prediction system 10 is configured to predict a probability that a subject 20 develops delirium based on a moving image in which the subject 20 appears.

The prediction system 10 includes an imaging device 11. The imaging device 11 is a device that acquires the moving image in which the subject 20 appears and outputs image data IM corresponding to the moving image. An example of the imaging device 11 is a video camera having sensitivity at least in a visible wavelength range. If a video camera having sensitivity in a near-infrared wavelength range is used, the moving image of the subject 20 can be acquired even at night. A range image camera, a thermal image camera or the like may also be used.

The prediction system 10 includes an image processing device 12. The image processing device 12 is configured to generate a behavior data BH corresponding to changes over time in relative positions of a plurality of feature points in a body of the subject 20 appearing in the moving image acquired by the imaging device 11 based on the image data IM.

Specifically, the image processing device 12 executes, on the image data IM, processing of detecting a predetermined feature point in the body of the subject 20 appearing in each of a plurality of frame images constituting the moving image. In an example illustrated in FIG. 1, both hands and a head of the subject 20 are detected as a plurality of feature points. By acquiring positions of the plurality of feature points for a plurality of frame images, information indicating changes over time in relative positions of the feature points can be obtained. The behavior data BH indicates the information.

The prediction system 10 includes a prediction device 13. The prediction device 13 includes an input interface 131, a processor 132 and an output interface 133.

The input interface 131 is configured to receive the behavior data BH generated by the image processing device 12. The behavior data BH may be received in real time from the image processing device 12 through wired communication or wireless communication, or may be received in non-real time via a storage medium in which the behavior data BH is stored.

The processor 132 is configured to execute processing of acquiring the probability that the subject 20 develops delirium by inputting the behavior data BH to a learned model M. The learned model M is a prediction algorithm generated through machine learning using a neural network to be described later. The learned model M is configured to input the behavior data BH corresponding to a behavior of the subject 20 and output the probability that the subject 20 develops delirium as a prediction result. The prediction result may be associated with a score (for example, any of values from 1 to 5) corresponding to the predicted probability.

The processor 132 is configured to output prediction data IF corresponding to the probability predicted by the learned model M from the output interface 133.

The prediction system 10 includes a notification device 14. The notification device 14 is configured to notify a user of a result predicted by the learned model M based on the prediction data IF received from the prediction device 13. A notification is performed using at least one of a visible notification, an audible notification and a tactile notification.

Figure 2:
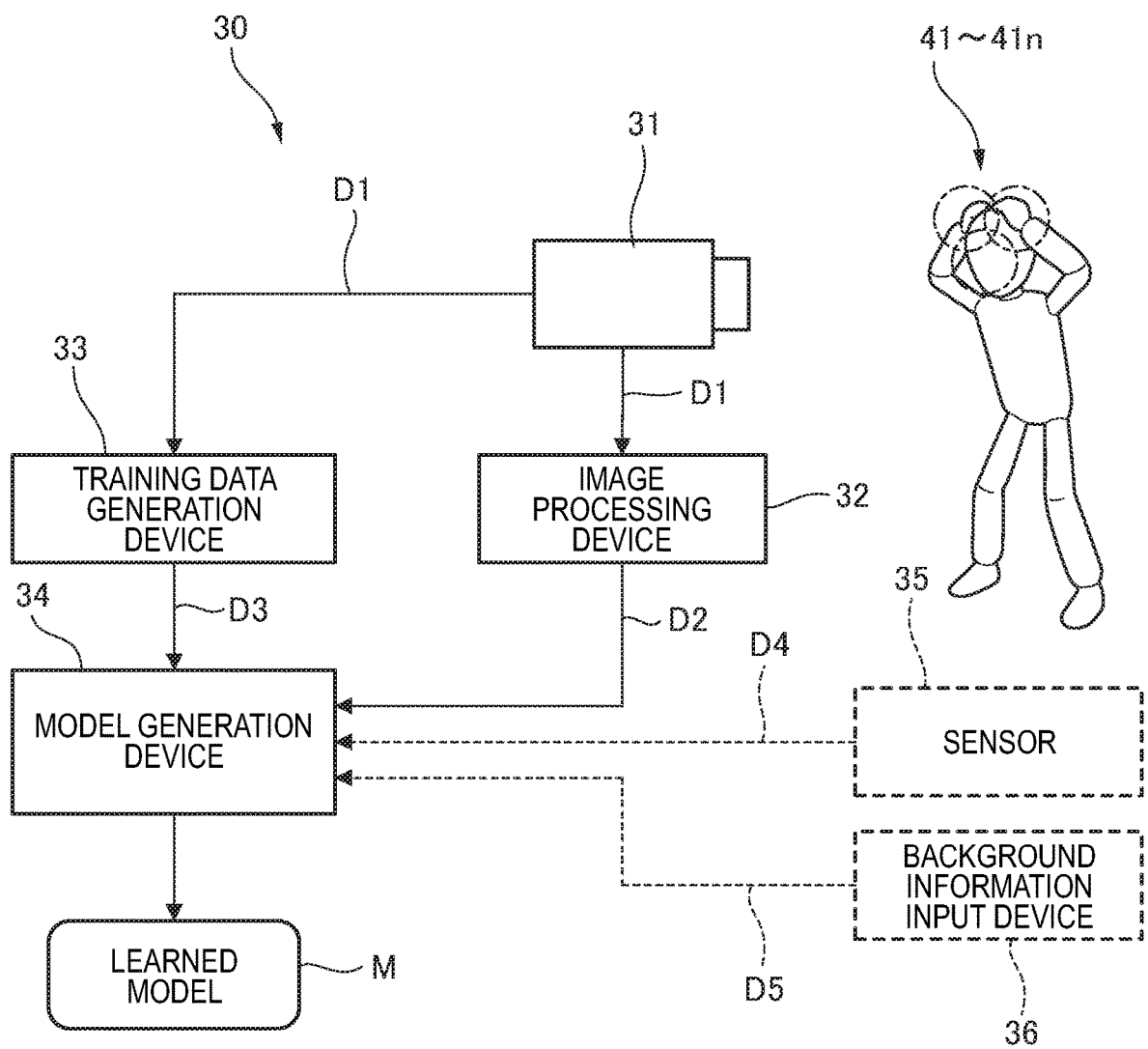
FIG. 2 illustrates a configuration of a model generation system according to the embodiment.

The learned model M is generated by a model generation system 30 illustrated in FIG. 2. That is, the model generation system 30 is configured to generate the learned model M applied to the prediction device 13.

The model generation system 30 includes an imaging device 31. The imaging device 31 is a device that acquires a moving image in which a subject appears and outputs first data D1 corresponding to the moving image. An example of the imaging device 31 is a video camera having sensitivity at least in the visible wavelength range. If a video camera having sensitivity in the near-infrared wavelength range is used, the moving image of the subject can be acquired even at night. A range image camera, a thermal image camera or the like may also be used.

The model generation system 30 includes an image processing device 32. The image processing device 32 is configured to generate, based on the first data D1, second data D2 corresponding to changes over time in relative positions of a plurality of feature points in a body of the subject appearing in the moving image acquired by the imaging device 31.

Specifically, the image processing device 32 executes, on the first data D1, processing of detecting a predetermined feature point in the body of the subject appearing in each of a plurality of frame images constituting the moving image. In an example illustrated in FIG. 2, both hands and a head of the subject 41 are detected as a plurality of feature points. By acquiring positions of the plurality of feature points for a plurality of frame images, information indicating changes over time in relative positions of the feature points can be obtained. The second data D2 indicates the information.

The first data D1 is acquired and the second data D2 is generated for a plurality of subjects 41 to 4n. The first data D1 for the same subject acquired at different time points is treated as being acquired from another subject. As a result, the first data D1 for n persons is acquired, and the second data D2 for n persons is generated. The first data D1 for n persons may be acquired by the same imaging device 31, or may be acquired by a plurality of different imaging devices 31.

Appropriate normalization processing may be used in order to convert information related to a positional relationship between a plurality of feature points originally defined in a three-dimensional space into information related to relative positions in a two-dimensional image. When the first data D1 for n persons is acquired by the plurality of imaging devices 31, processing for normalizing different imaging environments among the devices may be appropriately executed.

The second data D2 generated for each of the plurality of subjects 41 to 4n is configured to include information indicating from which subject the first data D1 is acquired, the second data D2 being generated based on the first data D1.

The model generation system 30 includes a training data generation device 33. The training data generation device 33 is configured to generate third data D3 indicating a determination result of whether each of the plurality of subjects 41 to 4n develops delirium based on the moving image acquired by the imaging device 31.

Figure 3:
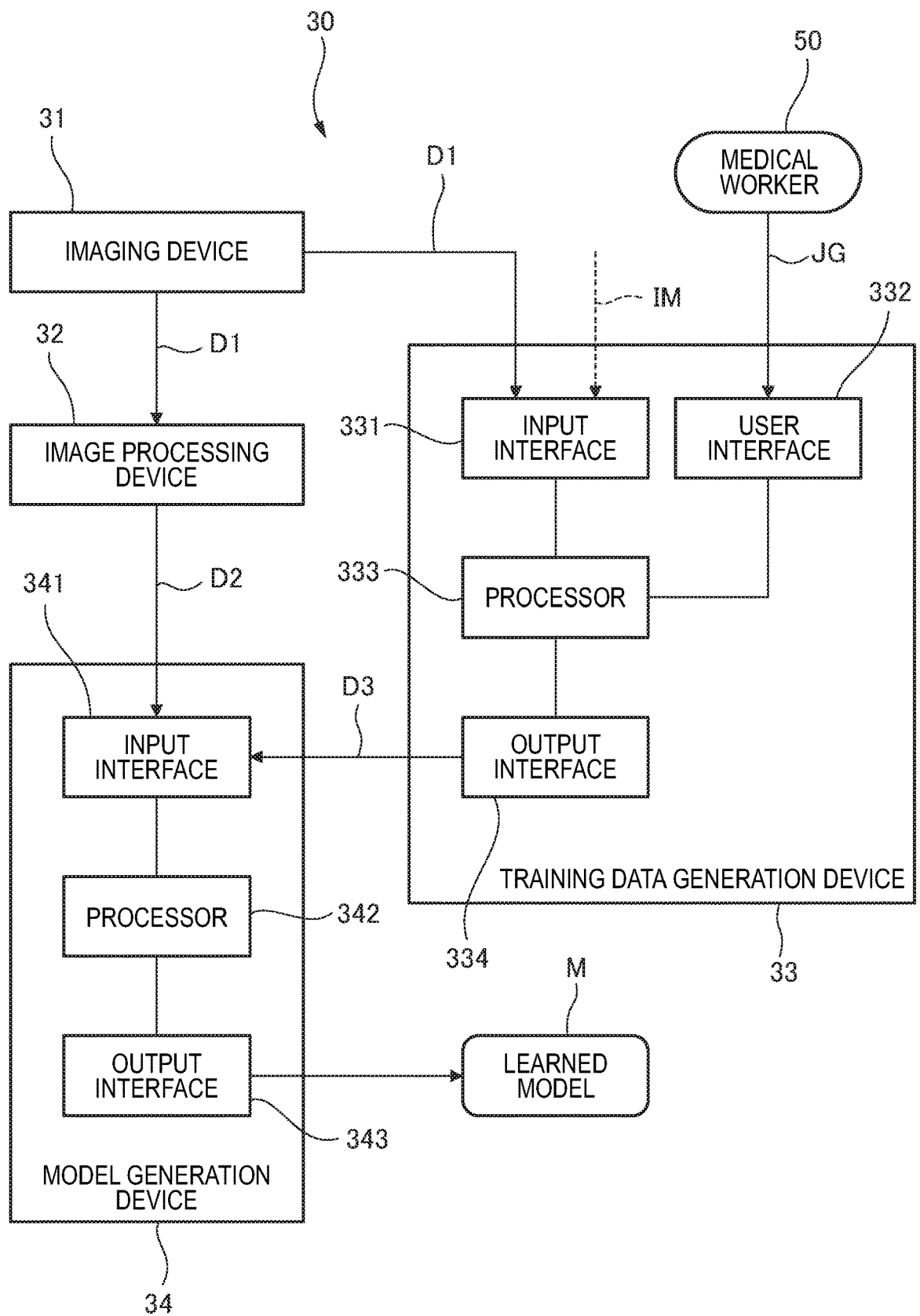
FIG. 3 illustrates a specific configuration of the model generation system in FIG. 2.

As illustrated in FIG. 3, the training data generation device 33 includes an input interface 331, a user interface 332, a processor 333 and an output interface 334.

The input interface 331 is configured to receive the first data D1 output from the imaging device 31.

The user interface 332 is configured to receive a determination JG as to whether a subject appearing in a moving image corresponding to the first data D1 develops delirium, which is made by a medical worker 50 based on the moving image. The determination JG may be provided as two choices of whether or not delirium is developed, or may be provided as a delirium evaluation score conforming to a predetermined standard. Examples of the standard include a confusion assessment method for the intensive care unit (CAM-ICU) and an intensive care delirium screening checklist (ICDSC). The determination JG may be input via an input device such as a keyboard or a mouse, or may be input through a voice recognition technique or a gesture recognition technique.

In a case of a medical worker who is familiar with delirium patients, the determination JG as to whether the subject develops delirium may be input with reference only to the moving image. However, it is often difficult to determine whether delirium is developed with reference only to the moving image. Therefore, it is preferable that the medical worker inputs the determination JG as to whether delirium is developed with reference to background information (medication information, sex, age and the like) of the subject in addition to the moving image of the subject.

The processor 333 is configured to generate the third data D3 by associating the determination JG input through the user interface 332 with the first data D1. As a result, the third data D3 for n persons is generated based on the first data D1 for n persons. That is, the third data D3 is configured to include information indicating from which subject the first data D1 is acquired, the subject being determined whether delirium is developed based on the first data D1.

The output interface 334 is configured to output the third data D3 generated by the processor 333.

As illustrated in FIGS. 2 and 3, the model generation system 30 includes a model generation device 34. The model generation device 34 includes an input interface 341, a processor 342 and an output interface 343.

The input interface 341 is configured to receive the second data D2 from the image processing device 32 and receive the third data D3 from the training data generation device 33.

The processor 342 is configured to generate the learned model M by causing the neural network to learn using the second data D2 and the third data D3. The learned model M is generated as a processing algorithm in which data corresponding to the changes over time in the relative positions of the plurality of feature points in the body of the subject appearing in the moving image acquired by the imaging device is input, and data corresponding to the probability that the subject develops delirium is output.

As processing of causing the neural network to learn, a known method related to supervised learning is appropriately used. That is, when the learned model M is generated, the third data D3 is used as training data. The third data D3 teach how it can be determined that the subject develops delirium (or does not develop delirium) depending on the changes over time in the relative positions of the plurality of feature points in the body of the subject. By specifying the second data D2 and the third data D3 having information related to the same first data D1, the second data D2 and the third data D3 derived from a common moving image are associated with each other.

The output interface 343 is configured to output the learned model M generated by the processor 342 in a form that can be mounted in the prediction device 13.

Delirium is found in many patients in an intensive care unit, leading to an increase in death rate, longer hospital stay and an increase in long-term cognitive impairment. However, a symptom of an onset tends to be underestimated in clinical practice. Although a standard evaluation method such as the CAM-ICU is prepared, there is still an actual situation in which it is inevitable to rely on subjectivity of an individual evaluator.

According to a configuration as described above, by preparing a large number of sets of the behavior of the subject and the determination result related to the onset of delirium and causing the neural network to learn the sets, it is possible to generate the learned model M as an algorithm capable of automating determination related to the onset of delirium while reducing degree of subjective contribution of an individual. By mounting such a learned model M in the prediction device 13, it is possible to automate the evaluation as to whether the subject develops delirium while reducing the degree of subjective contribution of the individual.

Since the second data D2 input to the neural network together with the training data corresponds to the changes over time in the relative positions of the plurality of feature points in the body of the subject extracted from the moving image acquired by the imaging device 31, an amount of information of the second data D2 is significantly reduced as compared with that of the first data D1 corresponding to the moving image. Therefore, it is possible to efficiently learn using data sets obtained from a large number of subjects while suppressing an increase in processing load.

As described with reference to FIG. 1, the behavior data BH indicating the changes over time in the relative positions of the plurality of feature points in the body of the subject 20 appearing in the moving image acquired by the imaging device 11 is input to the prediction device 13 in which the learned model M is mounted. An amount of information of the behavior data BH is significantly reduced compared to the image data IM corresponding to the moving image. Therefore, it is possible to suppress an increase in the processing load for predicting the probability that the subject 20 develops delirium.

Further, instead of the moving image itself in which the subject appears, information related to the changes over time in the relative positions of the plurality of feature points in the body of the subject extracted from the moving image is used for learning and prediction, so that privacy of the subject can be respected.

Figure 4:
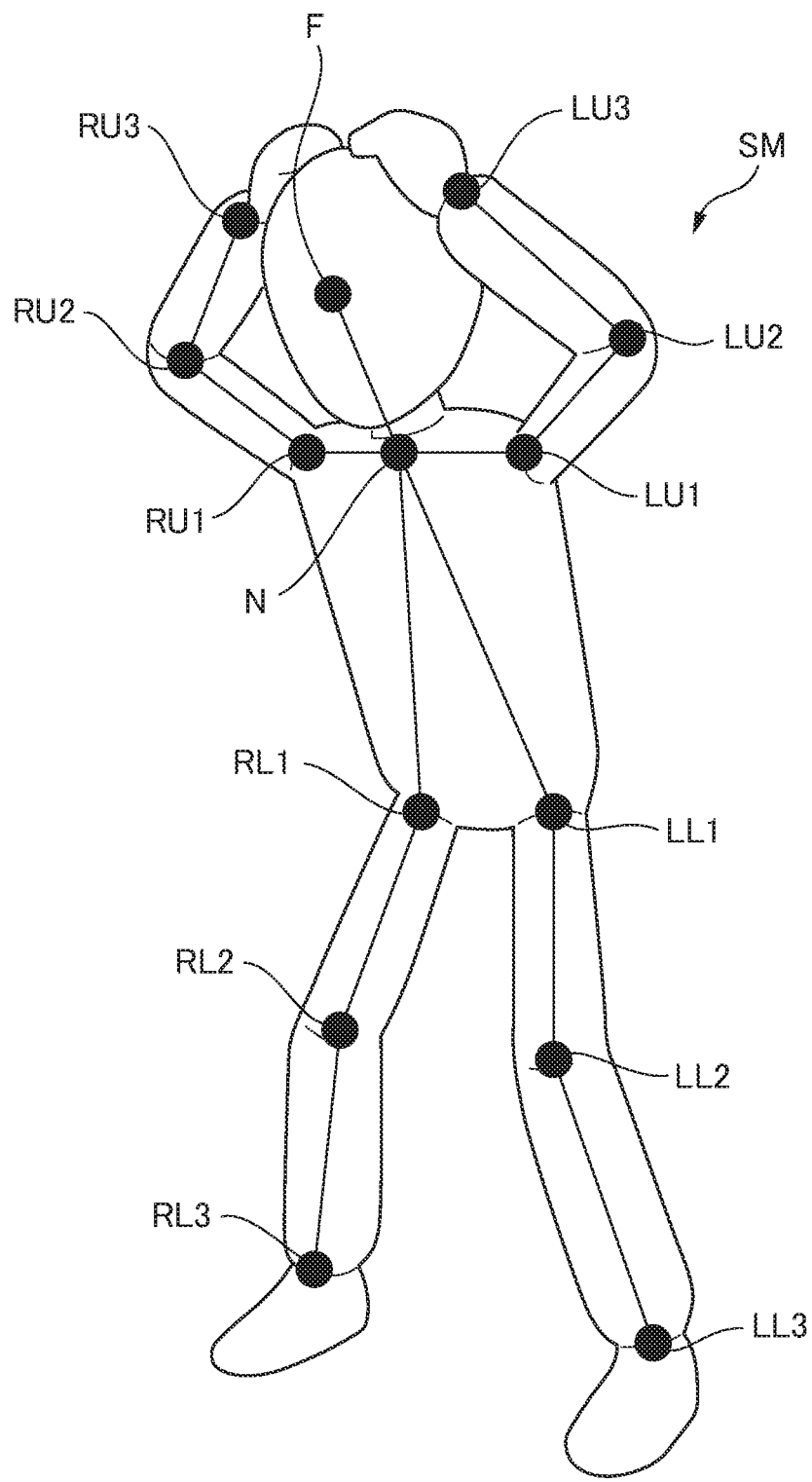
FIG. 4 illustrates a skeleton model that can be used by an image processing device in FIGS. 1 and 2.

The image processing device 32 of the model generation system 30 may be configured to generate the second data D2 by applying a skeleton model SM illustrated in FIG. 4 to the first data D1. An expression "applying a skeleton model" used in the present specification means that a plurality of feature points defined in the skeleton model are detected from the body of the subject appearing in the moving image acquired by the imaging device 31, and the plurality of feature points are connected to each other by a plurality of skeleton connection lines defined in the skeleton model.

The skeleton model SM includes a left shoulder feature point LU1, a left elbow feature point LU2 and a left wrist feature point LU3. The left shoulder feature point LU1 is a point corresponding to a left shoulder of a model human body. The left elbow feature point LU2 is a point corresponding to a left elbow of the model human body. The left wrist feature point LU3 is a point corresponding to a left wrist of the model human body. The left shoulder feature point LU1 and the left elbow feature point LU2 are connected by a skeleton connection line. The left elbow feature point LU2 and the left wrist feature point LU3 are connected by a skeleton connection line.

The skeleton model SM includes a right shoulder feature point RU1, a right elbow feature point RU2 and a right wrist feature point RU3. The right shoulder feature point RU1 is a point corresponding to a right shoulder of the model human body. The right elbow feature point RU2 is a point corresponding to a right elbow of the model human body. The right wrist feature point RU3 is a point corresponding to a right wrist of the model human body. The right shoulder feature point RU1 and the right elbow feature point RU2 are connected by a skeleton connection line. The right elbow feature point RU2 and the right wrist feature point RU3 are connected by a skeleton connection line.

The skeleton model SM includes a left hip feature point LL1, a left knee feature point LL2 and a left ankle feature point LL3. The left hip feature point LL1 is a point corresponding to a left portion of a hip of the model human body. The left knee feature point LL2 is a point corresponding to a left knee of the model human body. The left ankle feature point LL3 is a point corresponding to a left ankle of the model human body. The left hip feature point LL1 and the left knee feature point LL2 are connected by a skeleton connection line. The left knee feature point LL2 and the left ankle feature point LL3 are connected by a skeleton connection line.

The skeleton model SM includes a right hip feature point RL1, a right knee feature point RL2 and a right ankle feature point RL3. The right hip feature point RL1 is a point corresponding to a right portion of the hip of the model human body. The right knee feature point RL2 is a point corresponding to a right knee of the model human body. The right ankle feature point RL3 is a point corresponding to a right ankle of the model human body. The right hip feature point RL1 and the right knee feature point RL2 are connected by a skeleton connection line. The right knee feature point RL2 and the right ankle feature point RL3 are connected by a skeleton connection line.

The skeleton model SM includes a face feature point F and a neck feature point N. The face feature point F is a point corresponding to a face of the model human body. The neck feature point N is a point corresponding to a neck of the model human body. The neck feature point N is connected to each of the face feature point F, the left shoulder feature point LU1, the right shoulder feature point RU1, the left hip feature point LL1 and the right hip feature point RL1 by a skeleton connection line.

By applying such a skeleton model SM to the first data D1, it is possible to generate the second data D2 more accurately depicting the behavior of the subject. As a result of using such second data D2, it is possible to generate the learned model M in which a prediction of the probability that the subject develops delirium is enhanced.

The skeleton model SM illustrated in FIG. 4 is merely an example. A known skeleton model in which the number and positions of the feature points and the skeleton connecting lines are appropriately determined according to the behavior of the subject provided for the detection may be used. However, a skeleton model used for generating the second data D2 in the image processing device 32 of the model generation system 30 and a skeleton model used for generating the behavior data BH in the image processing device 12 of the prediction system 10 need to be the same. That is, when the skeleton model SM in FIG. 4 is used in the image processing device 32, the image processing device 12 generates the behavior data BH by applying the skeleton model SM to the image data IM. Accordingly, it is possible to provide the learned model M with a prediction result reflecting a learning content using the skeleton model SM.

Figure 5:
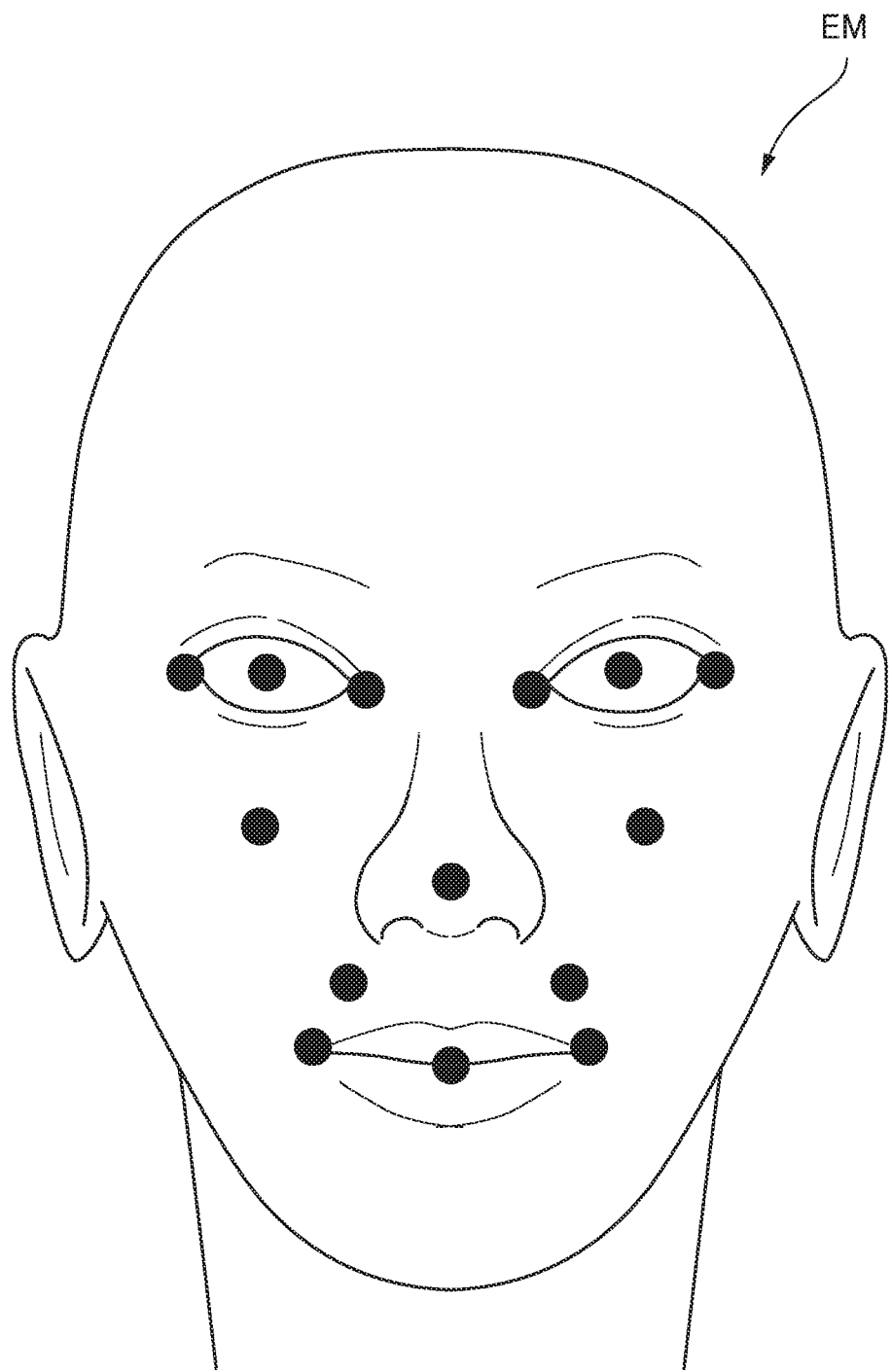
FIG. 5 illustrates an expression detection model that can be used by the image processing device in FIGS. 1 and 2.

In addition to or instead of the skeleton model SM, an expression detection model EM illustrated in FIG. 5 may be used. The expression detection model EM is used in a known image recognition technique for detecting a facial expression due to changes over time in relative positions of a plurality of feature points set on a model face. That is, the plurality of feature points for generating the second data D2 may be set to the face of the subject. In FIG. 5, black circles represent the respective feature points.

It is known that an expression of the subject is an important factor in delirium evaluation. According to a configuration as described above, the learned model M is generated using the second data D2 including information related to the expression of the subject, and thus it is possible to automate the delirium evaluation based on a moving image of the expression of the subject 20 acquired by the imaging device 11.

As illustrated in FIG. 2, the model generation system 30 may include a sensor 35. The sensor 35 is configured to output fourth data D4 corresponding to at least one of physiological information of the subject, a body motion of the subject, and a voice of the subject. Examples of the physiological information include body temperature, blood pressure, heart rate, transcutaneous arterial oxygen saturation (SpO2) and the like. The body motion of the subject may be implemented by an acceleration sensor, a vibration sensor or the like attached to the subject, a bed used by the subject, or the like. The voice of the subject may be acquired by the imaging device 31, or may be acquired by a sound collecting microphone or the like attached to the subject or the bed used by the subject.

Various kinds of information is detected by the sensor 35 in parallel with acquisition of the moving image of the subject by the imaging device 31. As a result, the fourth data D4 for n persons is generated in parallel with acquisition of the first data D1 for n persons. The fourth data D4 is configured to include information indicating from which subject the first data D1 is acquired, the fourth data D4 being generated together with the first data D1.

The fourth data D4 is input to the model generation device 34. That is, the input interface 341 of the model generation device 34 may be configured to also receive the fourth data D4.

The processor 342 of the model generation device 34 may be configured to cause the neural network to learn using the fourth data D4 in addition to the second data D2 and the third data D3. By specifying the second data D2, the third data D3 and the fourth data D4 having information related to the same first data D1, the second data D2, the third data D3 and the fourth data D4 derived from a common moving image are associated with each other.

According to such a configuration, it is possible to strengthen association between the behavior of the subject and the delirium evaluation at the time of learning. In particular, when the plurality of feature points in the body of the subject cannot be accurately detected from the moving image, the information acquired through the sensor 35 can play a supplementary role.

In this case, the prediction system 10 is configured to include a sensor 15 having a configuration the same as that of the sensor 35. The sensor 15 is configured to output supplementary data SP corresponding to the fourth data D4. The supplementary data SP is received by the input interface 131 of the prediction device 13. The processor 132 of the prediction device 13 is configured to acquire prediction data IF by inputting the supplementary data SP in addition to the behavior data BH to the learned model M.

According to such a configuration, it is possible to provide the learned model M with a prediction result reflecting a learning content using the fourth data D4 as well.

In addition to or instead of the sensor 35, the model generation system 30 may include a background information input device 36. The background information input device 36 is provided as a user interface that receives an input of background information on the subject from the medical worker. Examples of the background information include sex, age, height, weight, past history, medication information and the like of the subject. The background information input device 36 is configured to generate fifth data D5 including the background information.

The fifth data D5 is generated by the background information input device 36 before or in parallel with the acquisition of the moving image of the subject by the imaging device 31. As a result, the fifth data D5 for n persons is generated along with the acquisition of the first data D1 for n persons. The fifth data D5 is configured to include information indicating from which subject the first data D1 is acquired, the fifth data D5 being generated together with the first data D1.

The fifth data D5 is input to the model generation device 34. That is, the input interface 341 of the model generation device 34 may be configured to also receive the fifth data D5.

The processor 342 of the model generation device 34 may be configured to cause the neural network to learn using the fifth data D5 in addition to the second data D2 and the third data D3. By specifying the second data D2, the third data D3 and the fifth data D5 having information related to the same first data D1, the second data D2, the third data D3 and the fifth data D5 derived from a common moving image are associated with each other.

According to such a configuration, information that does not directly appear in the behavior of the subject can be reflected in the learning by the neural network.

In this case, the prediction system 10 is configured to include a background information input device 16 having a configuration the same as that of the background information input device 36. The background information input device 16 is configured to output background data BG corresponding to the fifth data D5. The background data BG is received by the input interface 131 of the prediction device 13. The processor 132 of the prediction device 13 is configured to acquire the prediction data IF by inputting the background data BG in addition to the behavior data BH to the learned model M.

According to such a configuration, it is possible to provide the learned model M with a prediction result reflecting a learning content using the fifth data D5 as well.

The prediction system 10 illustrated in FIG. 1 and the model generation system 30 illustrated in FIG. 2 are provided as independent systems, but a part thereof may be shared as necessary.

For example, the image data IM output from the imaging device 11 of the prediction system 10 may be received by the training data generation device 33 of the model generation system 30. In this case, the medical worker 50 can input, to the user interface 332, the determination JG as to whether the subject 20 appearing in the moving image corresponding to the image data IM develops delirium. At the time of inputting the determination JG, it does not matter whether it is necessary to refer to a prediction result by the prediction device 13. That is, the training data generation device 33 generates the third data D3 based on the image data IM.

The third data D3 generated based on the image data IM is received by the input interface 341 of the model generation device 34. On the other hand, the behavior data BH generated by the image processing device 12 of the prediction system 10 is also received by the input interface 341.

According to such a configuration, the processor 342 of the model generation device 34 can cause the neural network to perform new learning related to the delirium evaluation using a combination of the behavior data BH and the third data D3 generated based on the moving image acquired by the imaging device 11 of the prediction system 10. Since the behavior data BH is provided for prediction by the prediction device 13, the prediction algorithm by the prediction device 13 can be strengthened or corrected through the new learning.

Instead of the configuration in which the behavior data BH output from the image processing device 12 of the prediction system 10 is input to the model generation device 34, a configuration in which the image data IM output from the imaging device 11 of the prediction system 10 is input to the image processing device 32 of the model generation system 30 may be employed. In this case, the second data D2 and the third data D3 generated based on the image data IM are used for the learning by the neural network.

Each of the processor 333 of the training data generation device 33, the processor 342 of the model generation device 34, and the processor 132 of the prediction device 13 having the above-described functions may be implemented by a general-purpose microprocessor that operates in cooperation with a general-purpose memory. Examples of the general-purpose microprocessor include a CPU, MPU and GPU. Examples of the general-purpose memory include a ROM and a RAM. In this case, the ROM may store a computer program that executes the above-described processing. The ROM is an example of a non-transitory computer readable medium storing a computer program. The general-purpose microprocessor specifies at least a part of the program stored in the ROM, develops the program on the RAM, and executes the above-described processing in cooperation with the RAM. The computer program may be pre-installed in the general-purpose memory, or may be downloaded from an external server via a communication network and then installed in the general-purpose memory. In this case, the external server is an example of a non-transitory computer readable medium storing the computer program.

Each of the processor 333 of the training data generation device 33, the processor 342 of the model generation device 34, and the processor 132 of the prediction device 13 having the above-described functions may be implemented by a dedicated integrated circuit capable of executing the above-described computer program, such as a microcontroller, an ASIC or an FPGA. In this case, the above-described computer program is pre-installed in a storage element included in the dedicated integrated circuit. The storage element is an example of a computer readable medium that stores the computer program. Each of the processor 333 of the training data generation device 33, the processor 342 of the model generation device 34, and the processor 132 of the prediction device 13 having the above-described functions may be implemented by a combination of a general-purpose microprocessor and a dedicated integrated circuit.

When the training data generation device 33 and the model generation device 34 are provided as devices independent of each other, the output interface 334 of the training data generation device 33 and the input interface 341 of the model generation device 34 may be connected so as to allow wired communication or wireless communication. That is, the output interface 334 and the input interface 341 may be physical communication interfaces.

The training data generation device 33 and the model generation device 34 may be functional entities implemented in the same device. In this case, at least some functions of the processor 333 of the training data generation device 33 may be implemented by the processor 342 of the model generation device 34. The output interface 334 and the input interface 341 may be logical interfaces.

When the prediction device 13 and the notification device 14 are provided as devices independent of each other, the output interface 133 may be a physical interface that mediates data communication between the prediction device 13 and the notification device 14. The processor 132 and the notification device 14 may be functional entities implemented in the same control device. In this case, the output interface 133 may be a logical interface.

The above embodiment is merely an example for facilitating understanding of the presently disclosed subject matter. A configuration according to the above embodiment can be appropriately changed or improved without departing from the gist of the presently disclosed subject matter.

Each of the image data IM, the behavior data BH, the supplementary data SP and the background data BG handled in the prediction system 10 illustrated in FIG. 1 may be stored in a storage device (not illustrated). The storage device may be implemented by a semiconductor memory device, a hard disk drive device, a magnetic tape device or the like. The storage device may be provided in the prediction device 13, or may be provided in a cloud server device in which the prediction device 13 can perform data communication via a communication network. When the storage device is provided in the cloud server device, data can be uploaded or edited from each of the plurality of imaging devices 11, the plurality of image processing devices 12, the plurality of sensors 15 and the plurality of background information input devices 16, which can be connected to the communication network.

Each of the first data D1, the second data D2, the third data D3, the fourth data D4 and the fifth data D5 handled in the model generation system 30 illustrated in FIG. 2 may be stored in a storage device (not illustrated). The storage device may be implemented by a semiconductor memory device, a hard disk drive device, a magnetic tape device or the like. The storage device may be provided in the prediction device 13, or may be provided in a cloud server device in which the model generation device 34 can perform data communication via a communication network. When the storage device is provided in the cloud server device, data can be uploaded or edited from each of the plurality of imaging devices 31, the plurality of image processing devices 32, the plurality of training data generation devices 33, the plurality of sensors 35 and the plurality of background information input devices 36, which can be connected to the communication network.

The present embodiments are summarized as follows.

A first aspect for achieving the above object is a method for generating a learned model applied to a prediction device that predicts a probability that a subject develops delirium based on a moving image in which the subject appears, the method including:

acquiring first data corresponding to the moving image in which the subject appears;

generating, based on the first data, second data corresponding to changes over time in relative positions of a plurality of feature points in a body of the subject in the moving image;

generating third data indicating a determination result as to whether the subject develops delirium based on the moving image; and generating the learned model by causing a neural network to learn using the second data and the third data.

A second aspect for achieving the above object is a system for generating a learned model applied to a prediction device that predicts a probability that a subject develops delirium based on a moving image in which the subject appears, the system including:

an image processing device configured to generate, based on first data corresponding to the moving image in which the subject appears, second data corresponding to changes over time in relative positions of a plurality of feature points in a body of the subject in the moving image; and a model generation device configured to generate the learned model by causing a neural network to learn using the second data and third data indicating a determination result as to whether the subject develops delirium, the determination result being made based on the moving image.

A third aspect for achieving the above object is a non-transitory computer-readable recording medium storing a computer program executable in a system for generating a learned model applied to a prediction device that predicts a probability that a subject develops delirium based on a moving image in which the subject appears, the computer program being executed to:

generate, by an image processing device included in the system, based on first data corresponding to the moving image in which the subject appears, second data corresponding to changes over time in relative positions of a plurality of feature points in a body of the subject in the moving image; and generate, by a model generation device included in the system, the learned model by causing a neural network to learn using the second data and third data indicating a determination result as to whether the subject develops delirium, the determination result being made based on the moving image.

Delirium is found in many patients in an intensive care unit, leading to an increase in death rate, longer hospital stay and an increase in long-term cognitive impairment. However, a symptom of an onset tends to be underestimated in clinical practice. Although a standard evaluation method such as a confusion assessment method for the intensive care unit (CAM-ICU) is prepared, there is still an actual situation in which it is inevitable to rely on subjectivity of an individual evaluator.

According to a configuration according to each of the first to third aspects, by preparing a large number of sets of a behavior of the subject and the determination result related to the onset of delirium and causing the neural network to learn the sets, it is possible to generate the learned model as an algorithm capable of automating determination related to the onset of delirium while reducing degree of subjective contribution of an individual. By mounting such a learned model in the prediction device, it is possible to automate an evaluation as to whether the subject develops delirium while reducing the degree of subjective contribution of the individual.

Since the second data input to the neural network together with the third data as training data corresponds to the changes over time in the relative positions of the plurality of feature points in the body of the subject extracted from the moving image acquired by an imaging device, an amount of information of the second data is significantly reduced as compared with that of the first data corresponding to the moving image. Therefore, it is possible to efficiently learn using data sets obtained from a large number of subjects while suppressing an increase in processing load.

A fourth aspect for achieving the above object is a prediction device including:

an input interface configured to receive behavior data corresponding to changes over time in relative positions of a plurality of feature points in a body of a subject in a moving image in which the subject appears, the moving image being generated based on image data corresponding to the moving image;

a processor configured to acquire prediction data corresponding to a probability that the subject develops delirium by inputting the behavior data to a learned model generated by the generation method according to the first aspect; and an output interface configured to output the prediction data.

A fifth aspect for achieving the above object is a non-transitory computer-readable recording medium storing a computer program executable by a processor of a prediction device, the computer program being executed to, by the prediction device:

receive behavior data corresponding to changes over time in relative positions of a plurality of feature points in a body of a subject in a moving image in which the subject appears, the moving image being generated based on image data corresponding to the moving image;

acquire prediction data corresponding to a probability that the subject develops delirium by inputting the behavior data to a learned model generated by the generation method according to the first aspect; and output the prediction data.

A sixth aspect for achieving the above object is a prediction system including:

an image processing device configured to generate, based on image data corresponding to a moving image in which a subject appears, behavior data corresponding to changes over time in relative positions of a plurality of feature points in a body of the subject in the moving image; and a prediction device configured to acquire prediction data corresponding to a probability that the subject develops delirium by inputting the behavior data to a learned model generated by the generation method according to the first aspect, and outputs the prediction data.

According to a configuration according to each of the fourth to sixth aspects, the prediction device in which the learned model is mounted receives the behavior data indicating the changes over time in the relative positions of the plurality of feature points in the body of the subject appearing in the moving image acquired by the imaging device. An amount of information of the behavior data is significantly reduced as compared with that of the image data corresponding to the moving image. Therefore, it is possible to suppress an increase in the processing load for predicting the probability that the subject develops delirium.

With a configuration according to each of the first to sixth aspects, instead of the moving image itself in which the subject appears, information related to the changes over time in the relative positions of the plurality of feature points in the body of the subject extracted from the moving image is used for learning and prediction, such that privacy of the subject can be respected.

The invention claimed is:

1. A method for generating a learned model applied to a prediction device that predicts a probability that a subject develops delirium based on a moving image including a plurality of frame images in which the subject appears, the method comprising:

acquiring first data corresponding to the frame images each of which includes a plurality of feature points in a body of the subject;

generating, based on the first data, second data corresponding to changes over time in relative positions of the feature points extracted from the frame images;

generating third data indicating a determination result as to whether the subject develops delirium based on the frame images; and generating the learned model by causing a neural network to learn using the second data and the third data.

2. The method for generating the learned model according to claim 1, wherein the second data is generated by applying, to the first data, a skeleton model in which the plurality of feature points set for at least four limbs of a human body are connected based on a predetermined relationship.

3. The method for generating the learned model according to claim 1, wherein the second data is generated by applying, to the first data, an expression detection model in which the plurality of feature points are set to a face.

4. The method for generating the learned model according to claim 1, further comprising:

acquiring fourth data corresponding to at least one of physiological information acquired from the subject, body motion information of the subject, and voice information of the subject; and generating the learned model by causing the neural network to learn using the fourth data as well.

5. The method for generating the learned model according to claim 1, further comprising:

acquiring fifth data corresponding to at least one of background information of the subject, the background information of the subject including at least one of sex, age, height, weight, past history, or medication information of the subject; and generating the learned model by causing the neural network to learn using the fifth data as well.

6. A prediction device comprising:

an input interface configured to receive behavior data corresponding to changes over time in relative positions of a plurality of feature points in a body of a subject in a moving image including a plurality of frame images in which the subject appears, the moving image being generated based on image data corresponding to the frame images each of which includes the feature points;

a processor configured to acquire prediction data corresponding to a probability that the subject develops delirium by inputting the behavior data to a learned model generated by the method for generating the learned model according to claim 1; and an output interface configured to output the prediction data.

7. The prediction device according to claim 6, wherein the input interface is configured to receive supplementary data including at least one of physiological information acquired from the subject, body motion information of the subject, and voice information of the subject, and wherein the processor is configured to acquire the prediction data by inputting the supplementary data in addition to the behavior data to the learned model generated by the method for generating the learned model, which further includes acquiring fourth data corresponding to at least one of physiological information acquired from the subject, body motion information of the subject, and voice information of the subject; and generating the learned model by causing the neural network to learn using the fourth data as well.

8. The prediction device according to claim 6, wherein the input interface is configured to receive background data including background information of the subject, the background information of the subject including at least one of sex, age, height, weight, past history, or medication information of the subject and wherein the processor is configured to acquire the prediction data by inputting the background data in addition to the behavior data to the learned model, the generated by the method for generating the learned model, which further includes acquiring fifth data corresponding to at least one of background information of the subject; and generating the learned model by causing the neural network to learn using the fifth data as well.

9. A non-transitory computer-readable recording medium storing a computer program executable by a processor of a prediction device, the computer program being executed to, by the prediction device:

receive behavior data corresponding to changes over time in relative positions of a plurality of feature points in a body of a subject in a moving image including a plurality of frame images in which the subject appears, the moving image being generated based on image data corresponding to the frame images each of which includes the feature points;

acquire prediction data corresponding to a probability that the subject develops delirium by inputting the behavior data to a learned model generated by the method for generating the learned model according to claim 1; and output the prediction data.

10. A prediction system comprising:

an image processing device configured to generate, based on image data corresponding to a moving image including a plurality of frame images each of which includes a plurality of feature points in a body of a subject, behavior data corresponding to changes over time in relative positions of the feature points extracted from the frame images; and a prediction device configured to acquire prediction data corresponding to a probability that the subject develops delirium by inputting the behavior data to a learned model generated by the method for generating the learned model according to claim 1, and output the prediction data.

11. The prediction system according to claim 10, further comprising:

a user interface configured to input a determination result as to whether the subject develops delirium, the determination result being made by a medical worker based on the frame images corresponding to the image data; and a training data generation device configured to generate the third data based on the determination result.

12. A system for generating a learned model applied to a prediction device that predicts a probability that a subject develops delirium based on a moving image including a plurality of frame images in which the subject appears, the system comprising:

an image processing device configured to generate, based on first data corresponding to the frame images each of which includes a plurality of feature points in a body of the subject, second data corresponding to changes over time in relative positions of the feature points extracted from the frame images; and a model generation device configured to generate the learned model by causing a neural network to learn using the second data and third data indicating a determination result as to whether the subject develops delirium, the determination result being made based on the frame images.

13. A non-transitory computer-readable storage medium storing a computer program executable in a system for generating a learned model applied to a prediction device that predicts a probability that a subject develops delirium based on a moving image including a plurality of frame images in which the subject appears, the computer program being executed to:

generate, by an image processing device included in the system, based on first data corresponding to the frame images each of which includes a plurality of feature points in a body of the subject, second data corresponding to changes over time in relative positions of the feature points in extracted from the frame images; and generate, by a model generation device included in the system, the learned model by causing a neural network to learn using the second data and third data indicating a determination result as to whether the subject develops delirium, the determination result being made based on the frame images.

* * * * *